United States Patent [19]

Jelinek

[11] 4,421,329
[45] Dec. 20, 1983

[54] SPLIT DUAL LIP SEAL FOR GEAR CASE

[75] Inventor: Jerry G. Jelinek, La Habra, Calif.

[73] Assignee: Parker-Hannifin Corporation, Cleveland, Ohio

[21] Appl. No.: 421,636

[22] Filed: Sep. 22, 1982

[51] Int. Cl.³ .............................................. F16J 15/48
[52] U.S. Cl. .................................... 277/178; 277/192
[58] Field of Search .............. 277/178, 179, 181, 183, 277/192

[56] References Cited

U.S. PATENT DOCUMENTS

| 3,738,669 | 6/1973 | Anderson et al. | 277/178 |
| 3,776,559 | 12/1973 | Cawthorn | 277/178 |
| 3,866,923 | 2/1975 | Gorman | 277/178 |

Primary Examiner—Robert I. Smith

Attorney, Agent, or Firm—Joseph B. Balazs

[57] ABSTRACT

A two-part dual lip, reversible seal for gear cases and the like wherein a peripheral seal is to be established about a shaft which passes into the housing. Each part of the seal is of semi-circular configuration consisting of a metal retainer and an elastomeric sealing portion which is formed as an integral unit and which is positioned and retained in appropriate channels in the gear case. The elastomeric seal comprises dual sealing lips having a recess therebetween for charging with lubricant prior to assembly of the housing over the gears and shaft. Projection of the seal element at either end of its circumferential extent allows for controlled compression of the elastomeric material in engagement with the mating part of the seal and a continuous seal about the periphery of the shaft.

7 Claims, 6 Drawing Figures

SPLIT DUAL LIP SEAL FOR GEAR CASE

BACKGROUND OF THE INVENTION

This invention relates to seals for rotary shafts and more particularly to a dual lip integral seal which is installed in two pieces in a split housing which surrounds the shaft.

In environments such as gear cases and the like wherein one or more shafts enter the housing and wherein access must be available to the interior, the most practical way to install the gear case and seal the shafts is by the provision of half sections with a seal in each half section. A particular application in that of a diesel electric locomotive wherein power transfer is made from the traction motor to the wheels by way of a large set of spur gears. These gears must be kept lubricated with grease and since the gears must be meshed beforehand, the best way to accommodate the situation is to install the gear case in mating half sections.

Each half section of the gear case, in the past, contained channels adjacent the shaft openings and these channels were filled with packing material. The current and most popular form of packing is a metal-encased felt seal, the metal gripping the felt material and providing a support for placement in the channels. Since the environment is quite severe in that high surface speeds, high operating temperatures and moisture conditions are encountered these seals perform rather poorly and must be replaced frequently. The seals are subject to tearing and ripping and due to the high relative circumferential motion are particularly prone to bunching, all of which contribute to leakage and a high failure rate for the seals.

While such described seals are state of the art for locomotive applications, other forms of rotary seals are known in different environments. Thus, for example, U.S. Pat. No. 3,776,559 describes a shaft seal in which an elastomeric sealing section is combined with a backing member which may be metal or rigid plastic material. While a dual lip seal combined with a backing member is disclosed, as well as a split form of assembly, in this arrangement the seal and backing member grip the shaft and rotate with it, being guided at their periphery in an appropriately configured housing member.

U.S. Pat. No. 3,738,669 discloses a half seal arrangement consisting of an integral elastomeric seal and metal retainer member. This structure is a single lip seal in which each half of the seal is a mirror image of the mating half, and is arranged to be supported and to seal between radially spaced surfaces. The metal insert is fully surrounded by rubber to establish the fluid tight seal and care must be exercized so that the seal halves are properly oriented with respect to one another. In this seal a relatively wide base is used with the sealing lip lying between the axial dimension of the base.

SUMMARY OF THE INVENTION

The present invention is an integral retainer and elastomeric seal structure which is duplicated to establish a full circumferential, separable seal for rotatable shafts. A dual sealing lip arrangement is utilized which provides a combined sealing and wiping function and which serves as a repository for break-in lubricant. The seal is symmetrical and reversible and thus may be installed in its mounting channel in either direction. Since the seal halves are identical, no errors are incurred in matching of the component parts. An effective radial and circumferential seal is effected by an interference fit respectively with the shaft to be sealed and the halves of the seal structure, the unit being retained in a separable channeled housing.

The preferred configuration of each seal half is that of a half-ring metal retainer to which is bonded the elastomeric seal. The seal includes a body portion substantially coextensive with the retainer and a pair of radially inwardly extending divergent legs which terminate in sealing edges engageable with the shaft to be sealed. The legs extend circumferentially greater than one-half the circumference of a circle so that an interference fit is achieved with the matching seal half. Engagement of the seal with the shaft causes deflection of the legs in an axial direction, resulting in a controlled bias for the sealing edges.

In this arrangement adequate sealing force is achieved without undue wear of the elastomeric material. Typically one leg of the seal acts to retain lubricant within a housing while the other acts as a wiper to prevent the entry of contaminants. Since the seal is symmetrical, it can be installed in either direction without change in these characteristics. The metal retainer is advantageous in determining the shape of the seal, providing for ease of handling and insertion of same into the support channels and prevents bunching of the elastomeric material due to the rotary motion. In application in a gear case, the seals are a friction fit in the channels and thus the case may be opened and closed for servicing without disturbing the seals. Finally, much better heat transfer is achieved in this integral seal structure. The elastomeric material can be optimally compounded for this purpose, resulting in a long life for the sealing edges.

DETAILED DESCRIPTION OF THE DRAWINGS

Figure 1:
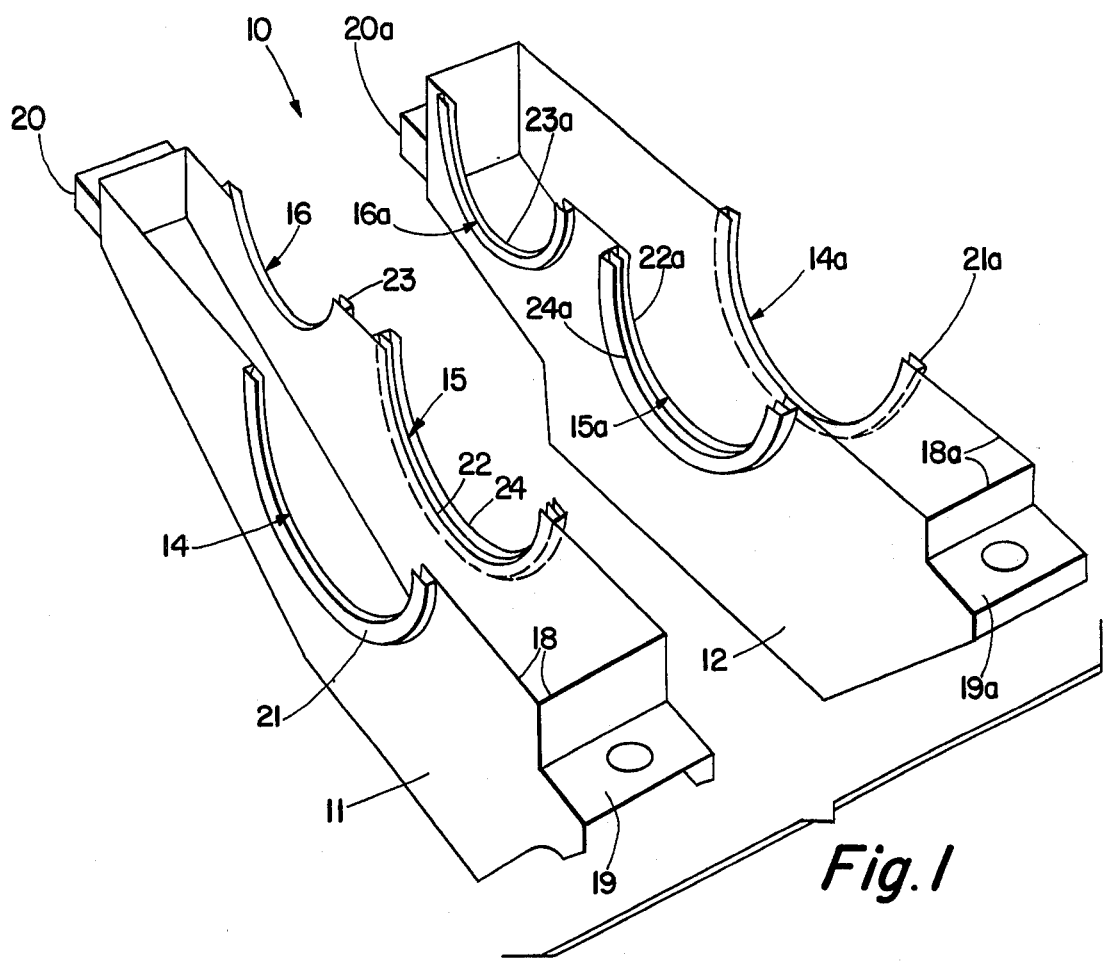
FIG. 1 is a perspective view of a typical gear case, laid open, comprising upper and lower housing halves, each having channels in which the seals of this invention are retained.

Referring now to FIG. 1, there is shown a typical gear case 10 consisting of an upper section 11 and lower section 12, each consisting of half of a sheet metal housing. In FIG. 1 the upper section 11 is laid open to expose the interior thereof which consists of open housing structure of generally rectangular configuration having aligned semi-circular apertures 14, 15 in the side faces thereof, and a further semi-circular aperture 16 at the rear of the housing. Corresponding apertures 14a, 15a, 16a are provided in the lower housing section 12 and it can be seen that when the upper section 11 is placed thereover such that the edges 18, 18a are contiguous, the apertures 14, 14a, 15, 15a and 16, 16a will form circular openings in the gear case 10. Mounting pads 19, 19a at the front and 20, 20a at the rear, each having a mounting pad hole therein, are provided for joining the upper and lower sections 11, 12 by means of appropriate bolts.

The gear case 10 in this embodiment of the invention is a housing for the gear train of a diesel electric locomotive and as such in the assembled condition provides aligned openings formed by the apertures 14, 14a and 15, 15a for the rotatable shaft of a bull gear serving to drive a wheel of the locomotive and a single opening formed by the apertures 16, 16a for a stub shaft supporting a pinion gear within the housing, driven by the traction motor. Lubrication of these gears is essential to operation of the locomotive and it is necessary to have convenient access to the interior of the gear case 10 for inspection, servicing and the like, while maintaining a reliable, effective seal on the shafts under operating conditions.

Single channels or seal retainers 21-23, 21a-23a are affixed at each of the apertures 14-16, 14a-16a and a further set of channels 24, 24a is located at the apertures 15, 15a forming a dual set of channels. Each of these channels is of generally the same configuration, being sized to fit the associated aperture and consisting of a u-shape sheet metal member in cross-section, of semi-circular configuration, extending substantially a full 180°, so as to form with a mating channel when upper and lower housings 11, 12 are joined, a substantially completely enclosed circular structure. The single channels 21-23, 21a-23a are affixed as by welding or the like to or adjacent the edge of the upper and lower housings 11, 12 forming the respective apertures 14-16, 14a-16a, while the further channels 24, 24a forming the dual channel structure are positioned outboard, but in line with adjacent channels 22, 22a.

Figure 2:
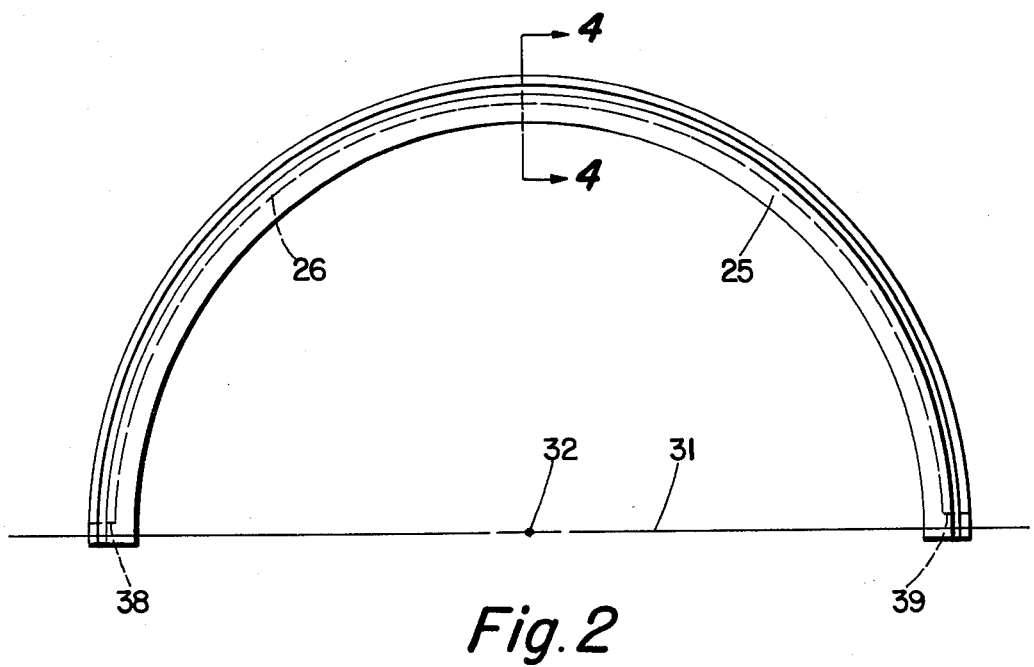
FIG. 2 is a side view of one section of the split dual lip seal of the invention.
Figure 4:
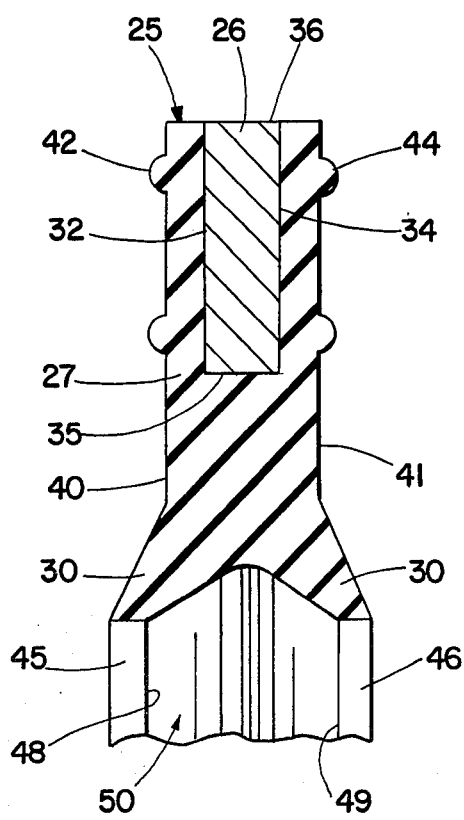
FIG. 4 is a cross-section view of the seal of FIG. 2, taken along the lines 4—4.

The seal 25 is best seen in FIGS. 2 and 4 as also forming a generally semi-circular structure consisting essentially of a metal retainer 26 and an elastomeric sealing section 27. The sealing section 27 in turn consists of body member 28 forming the bulk of the seal 25, terminating at its radially inward side in a pair of divergent legs 30, forming the shaft sealing portion.

Seal 25 is an integral structure being formed by molding of the elastomeric section 27 to the metal retainer 26, and is substantially a full semi-circular structure as seen in FIG. 2 in relation to a parting line 31 passing through the radial center of the seal 25 and the axis of the shaft being sealed, the latter depicted by the point 32.

Figure 3:
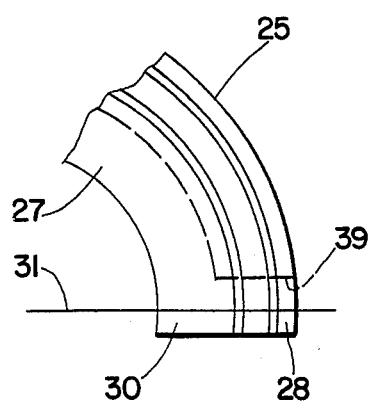
FIG. 3 is an enlarged view of one end of the seal of FIG. 2.

The metal retainer 26, shown in dashed lines in FIG. 2, is also generally semi-circular, being a stamping generally rectangular in cross-section having opposed arcuate faces 32, 34, inner and outer arcuate sides 35, 36 and rectangular end faces 38, 39. As seen in FIG. 3, retainer 26 is slightly less than 180° in circumferential extent, the end face 39 (and face 38 as well) terminating a small distance away from the parting line 31, the latter depicting the full 180° position.

The body section 28 is also generally rectangular in shape having opposed sides 40, 41 and envelops the radially inner side 35 and faces 32, 34 of the retainer 26, terminating flush with and leaving exposed the outer side 36 of the retainer. The body section 28 is configured essentially to conform to the u-shape of the associated channel but is slightly narrower and includes pairs of arcuate ribs 42, 44 on the opposed faces 40, 41 which are compressed upon insertion of the seal into the respective channel and serve to grip the channel and retain the seal therewith during servicing procedures. The outer side 36 of the retainer 26 and the outer surface of the seal body member 28 bottom in the channel when installed, and serve to contain the seal 27 in a radial position with respect to the shaft being sealed. The friction engagement between seal and channel also serves to prevent relative rotational movement therebetween caused by shaft rotation and it will be appreciated that the presence of the metal retainer structure 26 serves to prevent bunching of the elastomeric seal 27 due to this rotation.

At the radially inner end of the seal body member 28 are the divergent legs 30 which serve to engage and seal the shaft passing through the respective opening at which the seal 26 is disposed. In the uninstalled condition depicted in the Figures the legs 30 diverge outwardly and radially inwardly from the seal body member 28 at a slight angle with respect to a radial plane and culminate in parallel, semi-circular arcuate surfaces 45, 46, the inner edges of which form the sealing edges 48, 49 respectively. The inner surfaces forming the legs 30 also extend outwardly and radially inwardly from the body member 28 at a greater angle than those outer surfaces forming the legs 30, thereby providing a radially inwardly tapered profile for the legs 30 with a recess 50 therebetween. Upon engagement with a shaft to be sealed the seal 25 will be moved radially toward the shaft until the leg surfaces 45, 46 engage the shaft. Further compressive engagement will then cause deflection of the legs 30 to a more divergent position or an axial outward rotation of same away from the recess 50 until only the sealing edges 48, 49 are in contact with the shaft.

It will be apparent that the line contact of the sealing edges 48, 49 may be controlled by the degree of interference between the seal 26 and the periphery of the shaft being sealed, the shape of the sealing legs 30, as well as the compressibility of the elastomeric material forming the elastomeric portion 27 of the seal. What does result is a sealing surface at the sealing edges 48, 49 whose size and characteristics can be closely controlled to achieve superior sealing qualities. In embodiments of the invention disclosed it has been determined that the radial interference between the seal leg surfaces 45, 46 and the periphery of the shaft being sealed could be on the order of 0.015 inch to achieve highly satisfactory results. It is clear that many parameters are involved in such dimensioning, however, including among others, the speed of rotation of the shaft, the material constituting the seal, the trade-off between service life and seal integrity and other like considerations. It has been determined however, that with the seal of this invention superior heat transfer results can be achieved by selection of the constituents of the seal together with consideration for heat transfer provided by the configuration of the seal. Such considerations result almost directly in increased lifetime for seals of this type which are subject to an extremely hostile environment.

As noted previously the seal 26 is substantially a half-circle composite comprising the metal retainer 26, body portion 28 and legs 30, the latter two elements constituting the unitary elastomeric portion 27 of the seal. When installed in opposed channels or retainers such as 21, 21a which are positioned to form a substantially complete circle for retention of a pair of the seals 26 disposed in the channels consideration must be given to achieving a seal at the juncture between the pair of seals 25 which occurs at the parting line 31, depicted in FIGS. 2, 3 and 3a. The metal retainer 26 extends less than 180° and thus the end faces 38, 39 thereof are spaced a short distance from the parting line 31. In the embodiment of the invention depicted in FIG. 3 both the seal legs 30 and the body portion 28 of the seal 25 extend for greater than 180° and thus include projections extending beyond the parting line 31 at both peripheral ends of the seal 25. Thus it will be apparent that as a pair of seals 25 are installed, the projecting ends of each will be compressed in a circumferential direction to establish a full elastomeric seal at the parting line 31.

Figure 3A:
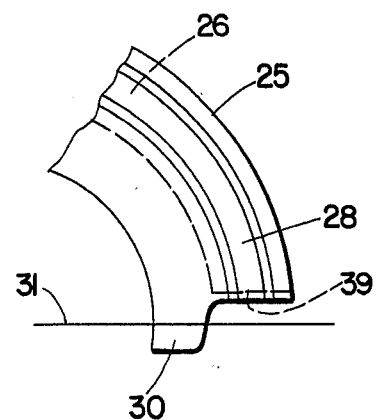
FIG. 3a is an enlarged view similar to FIG. 3 of one end of another embodiment of seal.

FIG. 3a describes a variation wherein only the seal legs 30 have projections which extend beyond the parting line 31, the body member 28 terminating closely adjacent to end wall 39 of the retainer 26 to provide a clearance therebetween. Since sealing at the shaft is critical this embodiment assures that such is provided by engagement between respective projections of seal legs 30 of adjacent seals 25, with the clearance between the respective body members 28 allowing for flow of elastomeric material in a controlled direction.

Figure 5:
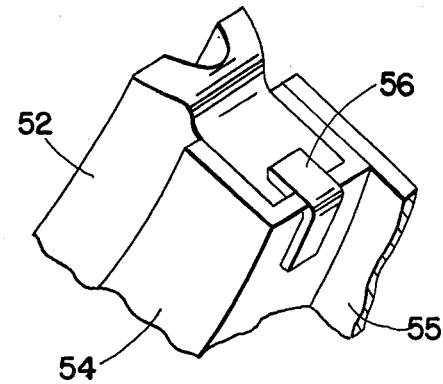
FIG. 5 is an enlarged view of one end of modified channel, similar to those shown in FIG. 1, with a seal in the channel.

FIG. 5 depicts a further variation of the invention in which a seal 52 similar to that shown in FIG. 3a is installed in channel 54, the latter secured to a portion of a gear case or other housing 55. It is apparent that considerable rotational forces are imposed upon the seals of this invention tending to move the seal 52, for example, relative to the channel 54. To assure that this cannot occur a tab 56 is secured to the channel 54 as by welding and extends across a part of the open face of the channel 54 at either end thereof to prevent such rotation. Preferably the tab 56 is positioned to be adjacent the end face of the metal insert in the seal 52 so as to provide a secure stop member and yet not have an effect upon the sealing characteristics of the elastomeric portion of the seal.

What is claimed is:

1. A two-piece sealing member for mounting in a split circular channel surrounding a rotatable shaft, each sealing member piece comprising a metal retainer in a generally half-ring configuration, and an elastomeric seal bonded to said retainer over the full inner periphery thereof, said seal comprising a body portion having a cross-sectional configuration conforming to the shape of said support channel and adapted for a snug fit therein so as to be constrained against radially outward movement and restrained against circumferential movement relative thereto by said support channel, and a pair of divergent legs disposed radially inwardly of said body portion, said legs having sealing edges at the radially inner ends thereof adapted for engagement with said rotatable shaft, said legs being adapted for deflection axially with respect to said body portion to place a light seating bias on said sealing edges when said split circular channel is moved to a mounting location surrounding said shaft, said legs having projecting portions at either end extending circumferentially greater than 180 degrees so as to engage corresponding projecting portions of said other sealing member piece, whereby said projecting portions may be circumferentially compressed by the constraint of said channel to establish a fluid tight seal about the periphery of said rotatable shaft, said pair of divergent legs being symmetrical with respect to said body portion so that said sealing member is reversible in said channel.

2. The sealing member set forth in claim 1 wherein said retainer is of generally rectangular cross-sectional configuration having a pair of axially opposite faces and a pair of end walls therebetween, said retainer being arcuate and of less than 180 degrees in circumferential extent so that said end walls of said respective sealing member pieces are slightly spaced from one another when in saling position, further including a recess between said divergent legs of said seal to provide a space for retention of lubricant, the radial extent of said recess being less than the radial extent of said legs so that said recess terminates radially inwardly of said body portion, said sealing edges being separated wider than the thickness of said body portion.

3. The sealing member set forth in claim 2 wherein said body portion of said seal is of rectangular cross-sectional configuration and further includes external ribs thereon projecting axially outwardly and adapted for compression toward said body member upon insertion of same into said channel to enhance engagement with said channel, said ribs comprising pairs of ribs on opposite faces of said body portion of said seal, said ribs being arcuate and extending substantially the entire circumferential extent of said body portion.

4. The sealing member set forth in claim 3 wherein said body member extends no further radially outwardly than the outermost face of said metal retainer and is coextensive in circumferential extent with said divergent legs.

5. The sealing member set forth in claim 4 wherein said divergent legs terminate in arcuate sealing faces including said sealing edges, said sealing faces being of semi-cylindrical configuration to the undeformed state of lying in a common plane parallel with the axis of said rotatable part.

6. The sealing member set forth in claim 3 wherein said body portion of said sealing member is circumferentially coextensive with said metal retainer.

7. The sealing member set forth in claim 3 wherein the radius of curvature of said sealing lips of said sealing member is on the order of 0.015 inch smaller than the radius of the shaft to be sealed thereby, so that said legs are caused to diverge further upon engagement with said shaft to impose a predetermined light seating stress on said sealing edges.

* * * * *